United States Patent
Lin et al.

(10) Patent No.: US 9,915,389 B1
(45) Date of Patent: Mar. 13, 2018

(54) MECHANICALLY-RETAINED SEALING DISKS FOR USE WITH FLUID REGULATORS

(71) Applicant: EMERSON PROCESS MANAGEMENT REGULATOR TECHNOLOGIES, INC, McKinney, TX (US)

(72) Inventors: Chun Lin, McKinney, TX (US); Ron Pelfrey, Sherman, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 30 days.

(21) Appl. No.: 15/425,638

(22) Filed: Feb. 6, 2017

(51) Int. Cl.
*F16L 55/027* (2006.01)
*F16J 15/02* (2006.01)

(52) U.S. Cl.
CPC ............ *F16L 55/027* (2013.01); *F16J 15/022* (2013.01)

(58) Field of Classification Search
CPC  F16J 15/10; F16J 15/102; F16J 15/104; F16J 15/022
USPC .................................................. 277/372, 445
See application file for complete search history.

(56) References Cited

U.S. PATENT DOCUMENTS

| | | | | |
|---|---|---|---|---|
| 890,103 A * | 6/1908 | Sullivan | ................... | F16J 9/063 277/445 |
| 2,043,424 A * | 6/1936 | Campbell | ................... | F16J 9/04 277/440 |
| 2,960,998 A * | 11/1960 | Sinker | ....................... | F16K 1/46 137/542 |
| 3,117,793 A * | 1/1964 | Hauser | ..................... | F16J 15/36 277/372 |
| 3,563,555 A * | 2/1971 | Koons | .................. | F16J 15/3272 277/309 |
| 3,623,700 A * | 11/1971 | Boteler | ................... | F16K 7/126 251/331 |
| 4,402,340 A * | 9/1983 | Lockwood, Jr. | ........ | F16K 1/305 137/322 |
| 5,564,714 A * | 10/1996 | Katsuno | ............. | B25B 27/0028 277/630 |
| 6,568,686 B2 * | 5/2003 | Hadley | .................. | F16J 15/348 277/370 |
| 6,776,360 B2 * | 8/2004 | Haruch | ................... | B05B 1/306 239/526 |
| 7,438,242 B2 * | 10/2008 | Ciampolini | .......... | F02M 51/061 239/533.11 |

(Continued)

*Primary Examiner* — Kristina R Fulton
*Assistant Examiner* — Lakshmi S Koneru
(74) *Attorney, Agent, or Firm* — Hanley, Flight & Zimmerman, LLC

(57) ABSTRACT

Mechanically-retained sealing disks for use with fluid regulators are disclosed. In some examples, an apparatus includes a disk holder having an inner surface. In some examples, the apparatus includes a disk gasket coupled to the inner surface of the disk holder. In some examples, the apparatus includes a sealing disk positioned in the disk holder. In some examples, the sealing disk has a front side including a sealing surface, and a back side located opposite the front side. In some examples, the back side of the sealing disk in positioned adjacent the disk gasket. In some examples, the apparatus includes a disk retainer coupled to the disk holder. In some examples, the disk retainer is to retain the sealing disk in the disk holder.

20 Claims, 10 Drawing Sheets

FIG. 4

(56) References Cited

U.S. PATENT DOCUMENTS

| | | | | |
|---|---|---|---|---|
| 7,513,483 B1* | 4/2009 | Blume | .................. | F16K 1/34 |
| | | | | 137/516.29 |
| 2008/0018058 A1* | 1/2008 | Kobayashi | ............. | F16J 15/062 |
| | | | | 277/650 |
| 2009/0267014 A1* | 10/2009 | Ishitoya | ................. | F16J 15/104 |
| | | | | 251/359 |
| 2013/0033139 A1* | 2/2013 | Tones | .................... | H02K 5/124 |
| | | | | 310/90 |
| 2014/0076426 A1* | 3/2014 | Mevius | ................. | F16J 15/062 |
| | | | | 137/494 |
| 2014/0084202 A1* | 3/2014 | Mevius | ................. | F16J 15/104 |
| | | | | 251/359 |

* cited by examiner

US 9,915,389 B1

MECHANICALLY-RETAINED SEALING DISKS FOR USE WITH FLUID REGULATORS

FIELD OF THE DISCLOSURE

This disclosure relates generally to sealing disks and, more specifically, to mechanically-retained sealing disks for use with fluid regulators.

BACKGROUND

Conventional disk assemblies for use with fluid regulators include a sealing disk positioned in a disk holder and partially retained therein by a disk retainer. When such conventional disk assemblies are in use, pressure may form between the disk holder and the back side of the sealing disk. If formed, such pressure has the potential to cause the sealing disk to slip and/or to be ejected from the disk holder.

SUMMARY

Mechanically-retained sealing disks for use with fluid regulators are disclosed. In some disclosed examples, an apparatus comprises a disk holder having an inner surface. In some disclosed examples, the apparatus comprises a disk gasket coupled to the inner surface of the disk holder. In some disclosed examples, the apparatus comprises a sealing disk positioned in the disk holder. In some disclosed examples, the sealing disk has a front side including a sealing surface, and a back side located opposite the front side surface. In some disclosed examples, the back side of the sealing disk in positioned adjacent the disk gasket. In some disclosed examples, the apparatus comprises a disk retainer coupled to the disk holder. In some disclosed examples, the disk retainer is to retain the sealing disk in the disk holder.

In some disclosed examples, an apparatus comprises a sealing disk having a front side including a sealing surface, and a back side located opposite the front side. In some disclosed examples, the apparatus comprises means for holding the sealing disk. In some disclosed examples, the apparatus comprises means for supporting the sealing disk in the means for holding. In some disclosed examples, the means for supporting is coupled to the means for holding. In some disclosed examples, the back side of the sealing disk is adjacent the means for supporting. In some disclosed examples, the apparatus comprises means for retaining the sealing disk in the means for holding. In some disclosed examples, the means for retaining is coupled to the means for holding.

Figure 1:
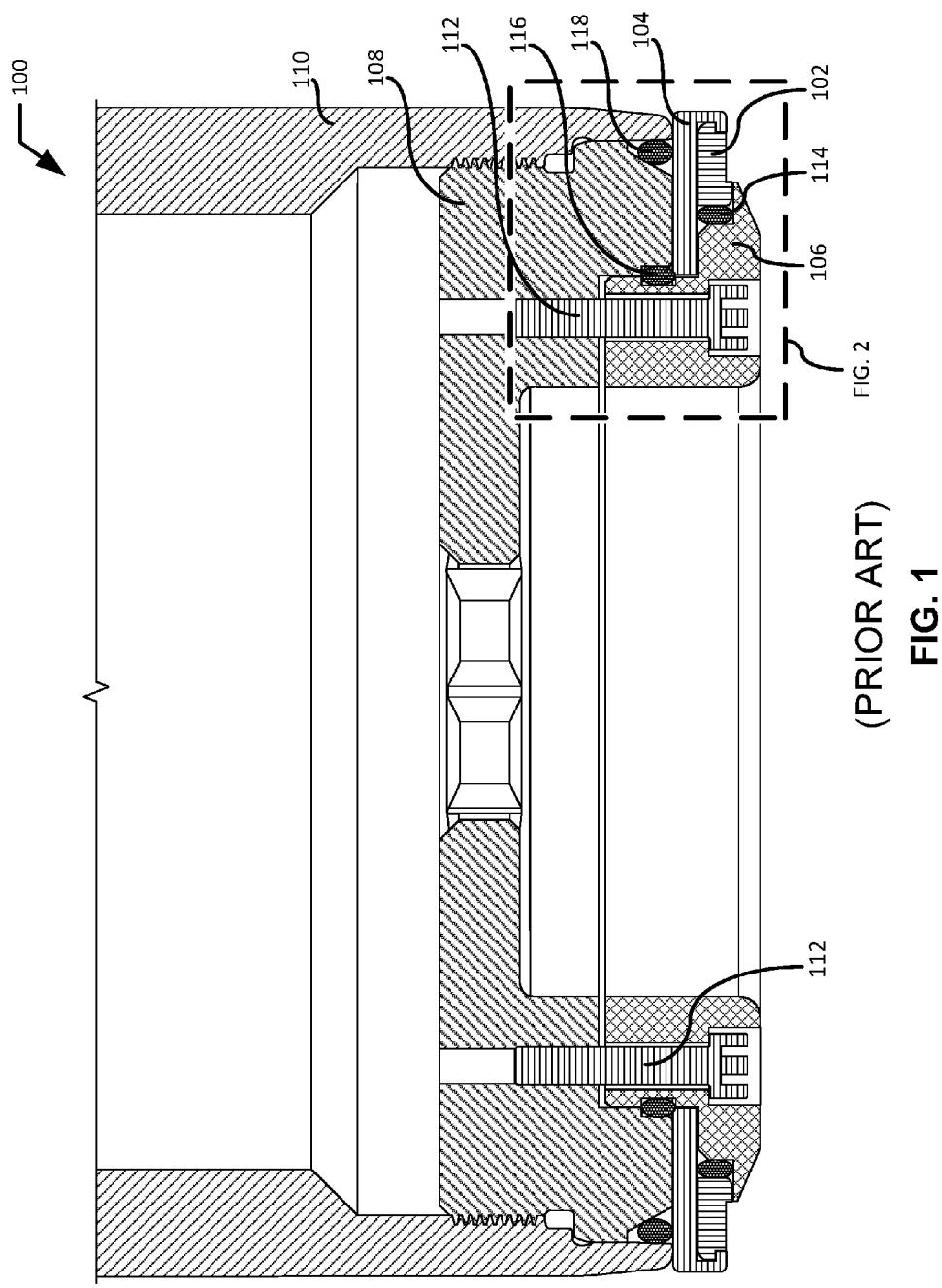
FIG. 1 is a cross-sectional view of a known disk assembly for use with a fluid regulator.

Certain examples are shown in the above-identified figures and described in detail below. The figures are not necessarily to scale and certain features and certain views of the figures may be shown exaggerated in scale or in schematic for clarity and/or conciseness.

DETAILED DESCRIPTION

Conventional disk assemblies for use with fluid regulators include a sealing disk positioned in a disk holder and partially retained therein by a disk retainer. When such conventional disk assemblies are in use, pressure may form between the disk holder and the back side of the sealing disk. If formed, such pressure has the potential to cause the sealing disk to slip and/or to be ejected from the disk holder. Differing coefficients of thermal expansion between the disk holder and the disk retainer may contribute to the formation of pressure adjacent the back side of the sealing disk when the conventional disk assembly is subjected to an extreme change in temperature. For example, as the disk holder and the disk retainer expand and/or contract at different rates relative to one another in response to the change in temperature, fluid may potentially leak past and/or around an O-ring positioned between, and intended to provide a seal between, the disk holder and the disk retainer. Once the fluid has advanced past the O-ring, there is commonly no other mechanical sealing means in the conventional disk assembly to prevent the fluid from reaching the back side of the sealing disk. Thus, the sealing disk of a conventional disk assembly may be more prone to potential slippage and/or potential ejection from the disk holder when the conventional disk assembly is exposed to extreme temperatures and/or extreme temperature changes.

Unlike the conventional disk assemblies described above that include sealing disks having the potential to slip and/or to be ejected from the disk holders within which such sealing disks are intended to be retained, the example disk assemblies disclosed herein include additional mechanical structures (e.g., retaining structures, sealing structures, etc.) to better retain sealing disks in disk holders. The additional mechanical structures of the example disk assemblies disclosed herein include a disk gasket positioned between a back side of a sealing disk and an inner surface of a disk holder. When the disk gasket and the sealing disk are positioned as such in the disk holder, the disk gasket supports the back side of the sealing disk and provides a seal between the back side of the sealing disk and the inner surface of the disk holder. The seal provided by the disk gasket advantageously prevents fluid from traveling to the back side of the sealing disk, thereby reducing the potential for the formation of pressure at the back side of the sealing disk. In view of this reduction in the potential for the formation of back side pressure, the sealing disk is less likely to be ejected from the disk holder. The disk gasket may also advantageously function as a secondary sealing surface should the sealing disk ever fail.

The additional mechanical structures of the example disk assemblies disclosed herein also include gripping protrusions and a gripping finger formed in and/or on a retaining flange of a disk retainer. The gripping protrusions and the gripping finger engage the sealing disk to advantageously provide additional resistance to the sealing disk potentially slipping within and/or being ejected from the disk holder. Before describing the details of example disk assemblies having additional mechanical structures (e.g., retaining structures, sealing structures, etc.) to better retain a sealing disk in a disk holder, a description of a known disk assembly is provided in connection with FIGS. 1 and 2.

Figure 2:
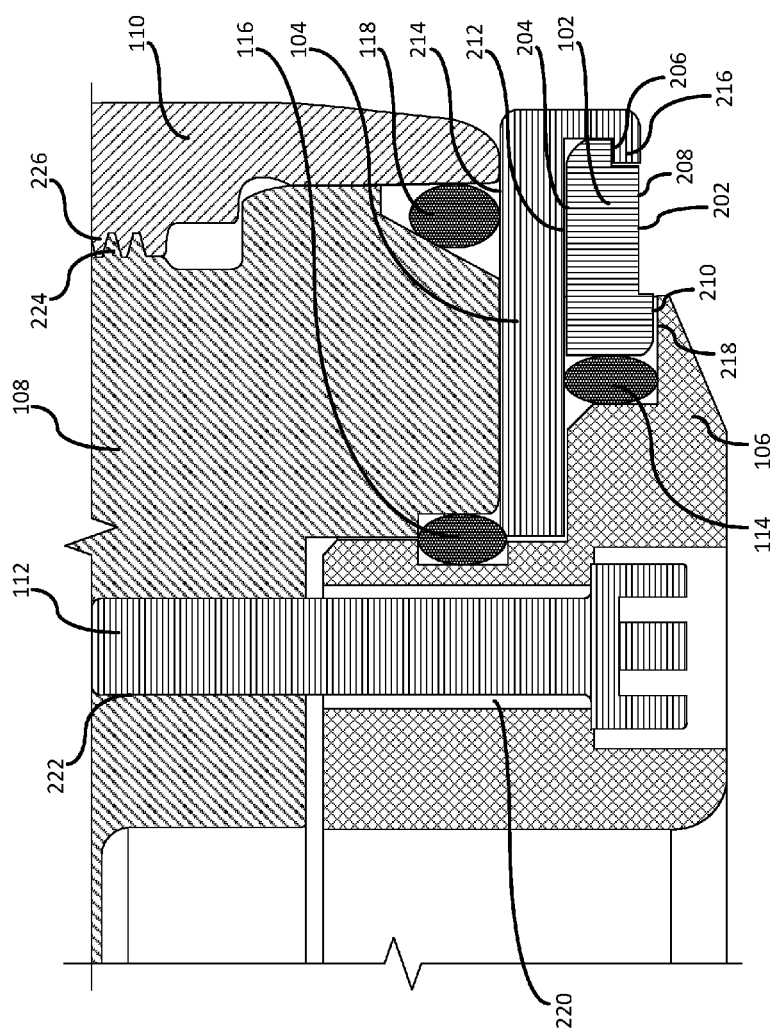
FIG. 2 is an enlarged view of a portion of FIG. 1.

FIG. 1 is a cross-sectional view of a known disk assembly 100 for use with a fluid regulator. FIG. 2 is an enlarged view of a portion of FIG. 1. The disk assembly 100 of FIGS. 1 and 2 includes a sealing disk 102, a disk holder 104, a disk retainer 106, a sleeve adaptor 108, a sleeve 110, fasteners 112, a first O-ring 114, a second O-ring 116, and a third O-ring 118.

The sealing disk 102 of the disk assembly 100 of FIGS. 1 and 2 has an annular shape. The sealing disk 102 includes a front side 202, and a back side 204 located opposite the front side 202. The front side 202 of the sealing disk 102 includes a first portion 206, a second portion 208, and a third portion 210. The first portion 206 of the front side 202 is configured to mate with a portion of the disk holder 104, as further described below. The second portion 208 of the front side 202 is a sealing surface configured to contact a seat ring of a fluid regulator when the fluid regulator is in a closed position. When the second portion 208 of the front side 202 of the sealing disk 102 contacts the seat ring of the fluid regulator, a fluid-tight seal may be formed between the seat ring and the second portion 208 of the front side 202 of the sealing disk 102. The third portion 210 of the front side 202 is configured to mate with a portion of the disk retainer 106, as further described below. The sealing disk 102 of FIGS. 1 and 2 is formed from an elastomeric material such as a polyurethane material.

The disk holder 104 of the disk assembly 100 of FIGS. 1 and 2 has an annular shape. The disk holder 104 includes an inner surface 212, an outer surface 214, and holding flange 216. The sealing disk 102 of FIGS. 1 and 2 is positioned in the disk holder 104 such that back side 204 of the sealing disk 102 is adjacent the inner surface 212 of disk holder 104. The holding flange 216 of the disk holder 104 contacts and/or mates with the first portion 206 of the front side 202 of the sealing disk 102 such that the holding flange 216 partially confines and/or restrains the sealing disk 102 in the disk holder 104. The disk holder 104 of FIGS. 1 and 2 is formed from a metallic material having a first coefficient of thermal expansion.

The disk retainer 106 of the disk assembly 100 of FIGS. 1 and 2 has an annular shape. The disk retainer 106 includes a retaining flange 218 and radial bores 220. The disk retainer 106 is coupled via the fasteners 112 (e.g., screws, bolts) to the sleeve adaptor 108 with the disk holder 104 and the sealing disk 102 secured therebetween, as shown in FIGS. 1 and 2. When the sealing disk 102 is positioned in the disk holder 104 and the disk holder 104 is positioned (e.g., captured) between the disk retainer 106 and the sleeve adaptor 108, the retaining flange 218 of the disk retainer 106 contacts and/or mates with the third portion 210 of the front side 202 of the sealing disk 102 such that the retaining flange 218 partially captures and/or urges the sealing disk 102 in and/or against the disk holder 104. The radial bores 220 of the disk retainer 106 are spaced about the annular shape of the disk retainer 106. Each of the radial bores 220 of the disk retainer 106 is configured to receive one of the fasteners 112 to couple the disk retainer 106 to the sleeve adaptor 108. The disk retainer 106 of FIGS. 1 and 2 is formed from a metallic material having a second coefficient of thermal expansion that differs from the first coefficient of thermal expansion of the disk holder 104.

The sleeve adaptor 108 of the disk assembly 100 of FIGS. 1 and 2 has an annular shape. The sleeve adaptor 108 includes radial bores 222 and a threaded portion 224. The sleeve adaptor 108 is coupled via the fasteners 112 to the disk retainer 106. The radial bores 222 of the sleeve adaptor 108 are spaced about the annular shape of the sleeve adaptor 108 such that the radial bores 222 of the sleeve adaptor 108 align with corresponding ones of the radial bores 220 of the disk retainer 106. Each of the radial bores 222 of the sleeve adaptor 108 is configured to receive one of the fasteners 112 passing through one of the corresponding radial bores 220 of the disk retainer 106 to couple the disk retainer 106 to the sleeve adaptor 108. The sleeve adaptor 108 is also coupled via a threaded connection to the sleeve 110. The threaded portion 224 of the sleeve adaptor 108 is configured to mate with an example threaded portion 226 of the sleeve 110 to couple the sleeve adaptor 108 to the sleeve 110. When the sleeve adaptor 108 is coupled to the disk retainer 106 and to the sleeve 110 as shown in FIGS. 1 and 2, the disk holder 104 is positioned (e.g., captured) between the disk retainer 106 and the sleeve adaptor 108, the retaining flange 218 of the disk retainer 106 partially captures and/or urges the sealing disk 102 in and/or against the disk holder 104, and the sleeve 110 contacts the outer surface 214 of the disk holder 104.

The first O-ring 114 of the disk assembly 100 of FIGS. 1 and 2 is configured to provide a seal between the sealing disk 102, the disk holder 104, and the disk retainer 106. The second O-ring 116 of the disk assembly 100 of FIGS. 1 and 2 is configured to provide a seal between the disk holder 104, the disk retainer 106 and the sleeve adaptor 108. The third O-ring 118 is configured to provide a seal between the disk holder 104, the sleeve adaptor 108, and the sleeve 110.

When the disk assembly 100 of FIGS. 1 and 2 is in use, pressure may form between the inner surface 212 of the disk holder 104 and the back side 204 of the sealing disk 102. Pressure acting on the back side 204 of the sealing disk 102 may potentially cause the sealing disk 102 to slip and/or to be ejected from the disk holder 104. The difference between the first coefficient of thermal expansion of the disk holder 104 and the second coefficient of thermal expansion of the disk retainer 106 may contribute to the formation of such pressure when the disk assembly 100 is subjected to an extreme change in temperature. For example, as the disk holder 104 and the disk retainer 106 expand and/or contract at different rates relative to one another in response to the change in temperature, fluid may potentially leak past and/or around the first O-ring 114 of the disk assembly 100. Once the fluid has advanced past the first O-ring 114, there is no other mechanical sealing means in the conventional disk assembly 100 to prevent the fluid from reaching the back side 204 of the sealing disk 102. Thus, the sealing disk 102 of the disk assembly 100 may be more prone to potential slippage and/or potential ejection from the disk holder 104 when the disk assembly 100 is exposed to extreme temperatures and/or extreme temperature changes.

Figure 3:
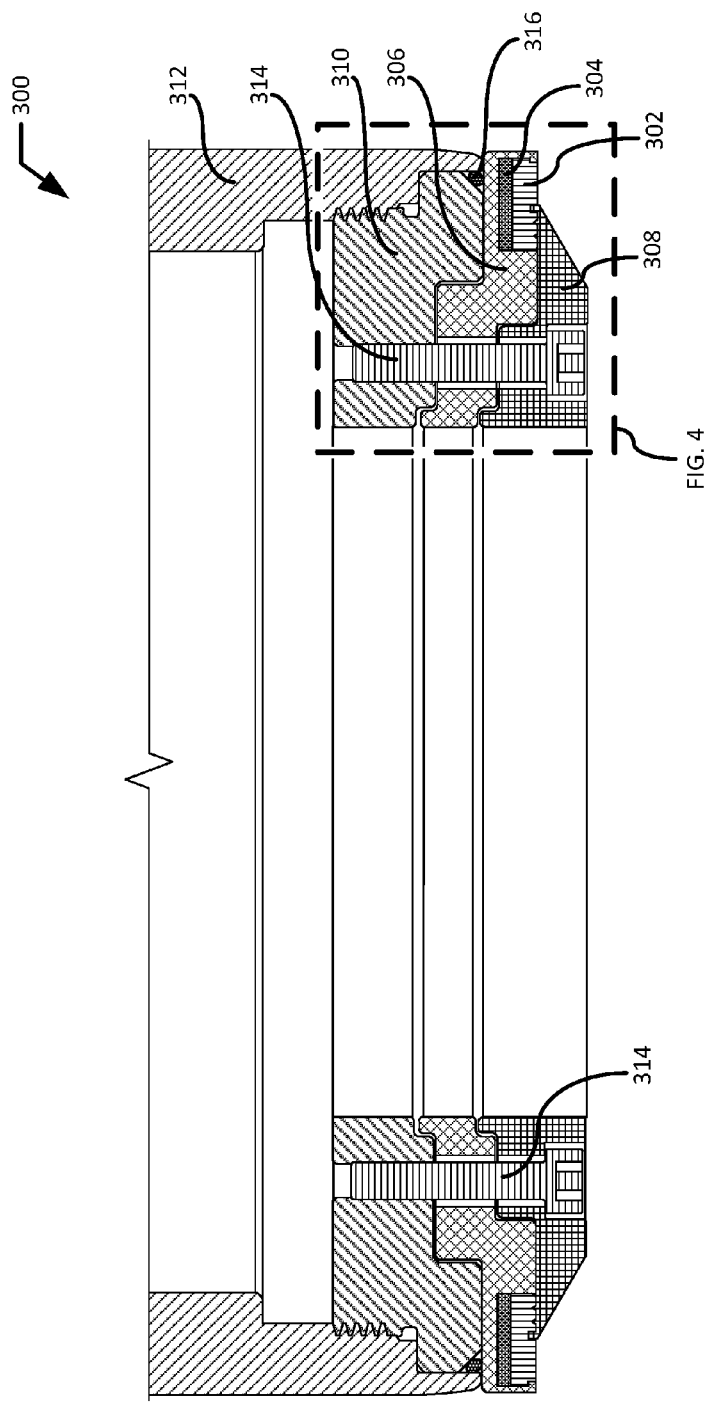
FIG. 3 is a cross-sectional view of an example improved disk assembly for use with a fluid regulator.
Figure 4:
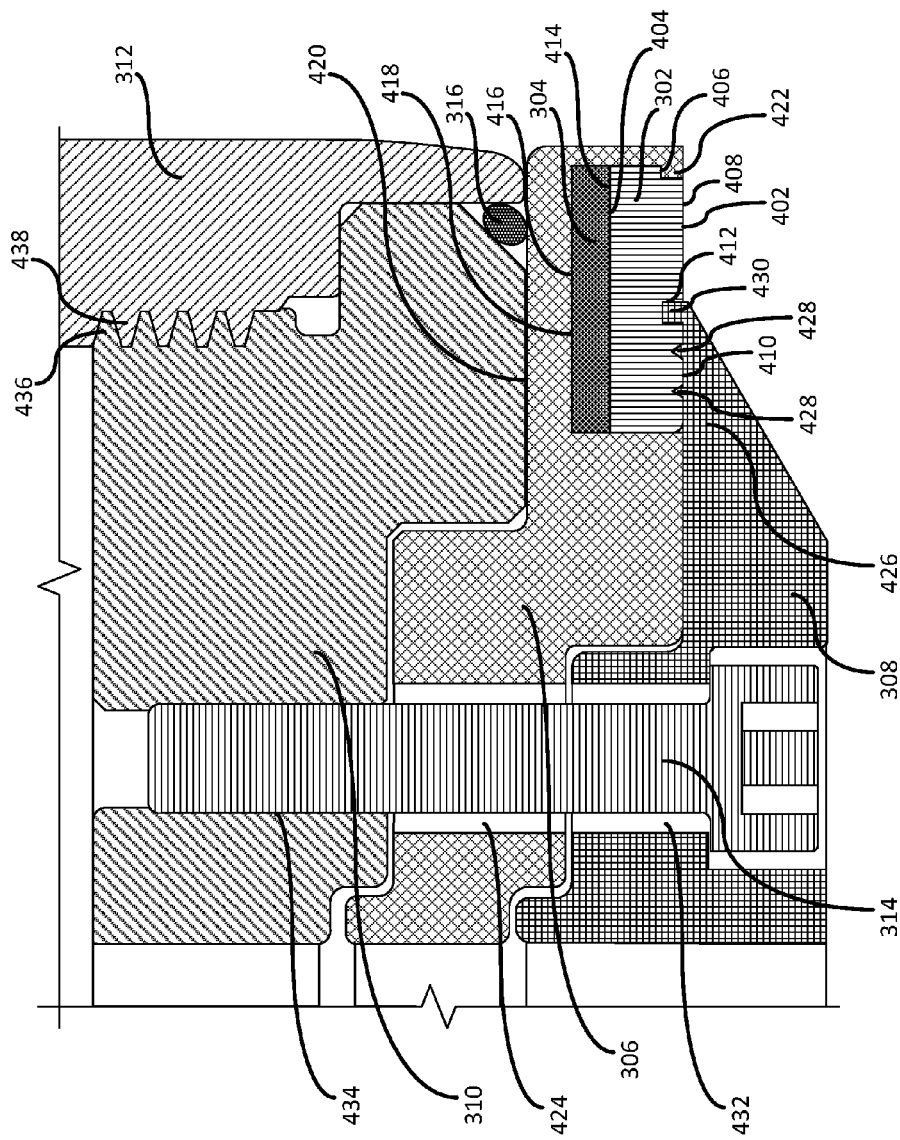
FIG. 4 is an enlarged view of a portion of FIG. 3.

Relative to the conventional disk assembly 100 of FIGS. 1 and 2 described above, the example disk assemblies described herein include additional mechanical structures (e.g., retaining structures, sealing structures, etc.) to better retain a sealing disk in a disk holder. FIG. 3 is a cross-sectional view of an example improved disk assembly 300 for use with a fluid regulator. FIG. 4 is an enlarged view of a portion of FIG. 3. The improved disk assembly 300 of FIGS. 3 and 4 includes an example sealing disk 302, an example disk gasket 304, an example disk holder 306, an example disk retainer 308, an example sleeve adaptor 310, an example sleeve 312, example fasteners 314, and an example O-ring 316.

The example sealing disk 302 of the improved disk assembly 300 of FIGS. 3 and 4 has an annular shape. The sealing disk 302 includes an example front side 402, and an example back side 404 located opposite the front side 402. The front side 402 of the sealing disk 302 includes an example first portion 406, an example second portion 408, an example third portion 410, and an example groove or notch 412 located between the second portion 408 and the third portion 410. The first portion 406 of the front side 402 is configured to mate with a portion of the example disk holder 306, as further described below. The second portion 408 of the front side 402 is a sealing surface configured to contact a seat ring of a fluid regulator when the fluid regulator is in a closed position. When the second portion 408 of the front side 402 of the sealing disk 302 contacts the seat ring of the fluid regulator, a fluid-tight seal may be formed between the seat ring and the second portion 408 of the front side 402 of the sealing disk 302. The third portion 410 of the front side 402 is configured to contact and/or mate with a first type of mechanical retaining structure (e.g., one or more gripping protrusion(s)) of the disk retainer 308, as further described below. The notch 412 of the front side 402 is configured to contact and/or mate with a second type of mechanical retaining structure (e.g., one or more gripping finger(s)) of the disk retainer 308, as further described below. In some examples, the notch 412 may be of a shape and/or size that differs from the size and/or shape of the notch 412 as shown in FIG. 4. The sealing disk 302 of FIGS. 3 and 4 is formed from an elastomeric material. For example, the sealing disk 302 may be formed from a polyurethane material. In other examples, the sealing disk may be formed from one or more other materials including, for example, a nylon material, a polytetrafluoroethylene material, or a polyoxymethylene material.

Figure 5:
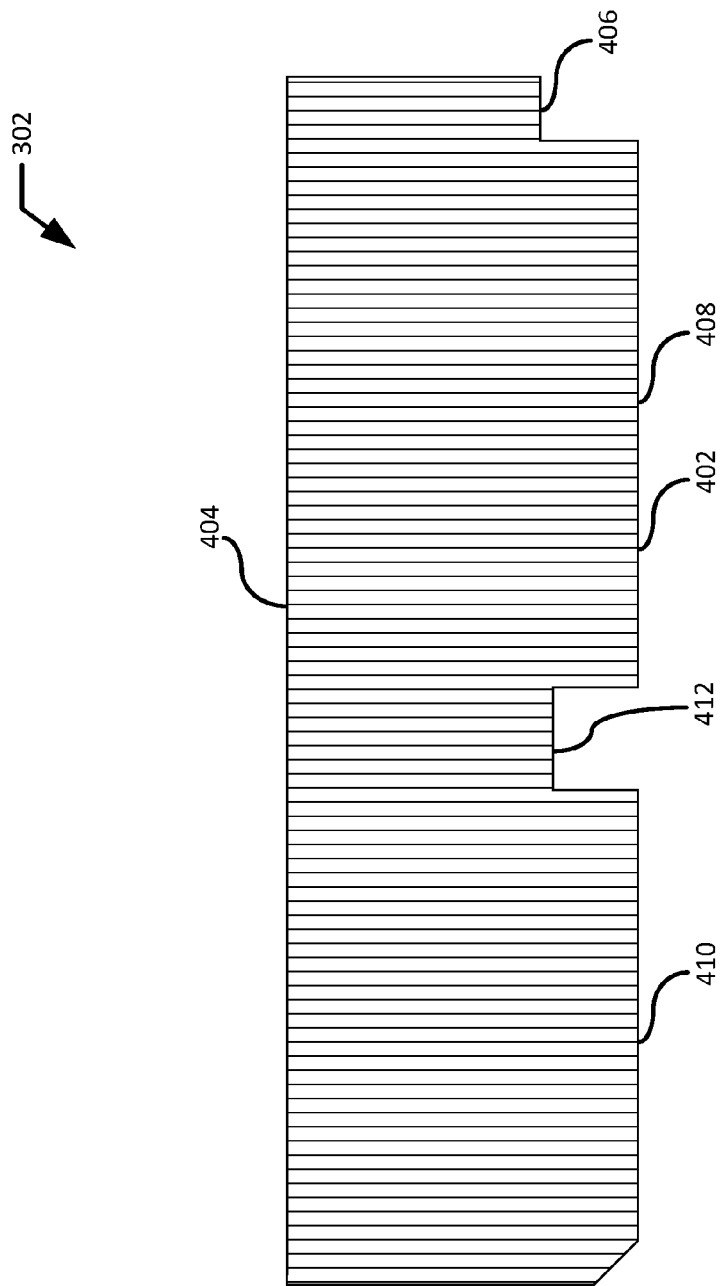
FIG. 5 is an enlarged cross-sectional view showing a partial cross-sectional profile of the example sealing disk of FIGS. 3 and 4.

FIG. 5 is an enlarged cross-sectional view showing a partial cross-sectional profile of the example sealing disk 302 of FIGS. 3 and 4. FIG. 5 illustrates the front side 402, the back side 404, the first portion 406, the second portion 408, the third portion 410 and the notch 412 of the sealing disk 302 of FIGS. 3 and 4 in greater detail.

The example disk gasket 304 of the improved disk assembly 300 of FIGS. 3 and 4 has an annular shape. The disk gasket 304 includes an example front side 414, and an example back side 416 located opposite the front side 414. As further described below, the disk gasket 304 supports the sealing disk 302 in the disk holder 306. The disk gasket 304 of FIGS. 3 and 4 is formed from a rubber material. For example, the disk gasket 304 may be formed from a nitrile butadiene rubber (NBR) material.

The example disk holder 306 of the improved disk assembly 300 of FIGS. 3 and 4 has an annular shape. The disk holder 306 includes an example inner surface 418, an example outer surface 420, an example holding flange 422, and example radial bores 424. The disk gasket 304 of FIGS. 3 and 4 is positioned in and/or coupled (e.g., bonded) to the disk holder 306 such that back side 416 of the disk gasket 304 is adjacent the inner surface 418 of the disk holder 306 of FIGS. 3 and 4. The sealing disk 302 of FIGS. 3 and 4 is positioned in the disk holder 306 such that back side 404 of the sealing disk 302 is adjacent the front side 414 of the disk gasket 304 of FIGS. 3 and 4. When the disk gasket 304 and the sealing disk 302 are positioned in the disk holder 306 (e.g., as shown in FIGS. 3 and 4), the disk gasket 304 supports the back side 404 of the sealing disk 302, and provides a seal between the back side 404 of the sealing disk 302 and the inner surface 418 of the disk holder 306. The disk gasket 304 accordingly prevents fluid from traveling to the back side 404 of the sealing disk 302. The holding flange 422 of the disk holder 306 contacts and/or mates with the first portion 406 of the front side 402 of the sealing disk 302 such that the holding flange 422 partially confines and/or restrains the sealing disk 302 in the disk holder 306.

The example disk holder 306 of FIGS. 3 and 4 is coupled via the fasteners 314 (e.g., screws, bolts) to the disk retainer 308 and to the sleeve adaptor 310 of FIGS. 3 and 4. The radial bores 424 of the disk holder 306 are spaced about the annular shape of the disk holder 306 such that the radial bores 424 of the disk holder 306 align with corresponding ones of radial bores (described below) of the disk retainer 308 and corresponding ones of radial bores (described below) of the sleeve adaptor 310. Each of the radial bores 424 of the disk holder 306 is configured to receive one of the fasteners 314 passing through and/or into one of the corresponding radial bores of the disk retainer 308 and one of the corresponding radial bores of the sleeve adaptor 310 to couple the disk holder 306 to the disk retainer 308 and to the sleeve adaptor 310. The disk holder 306 of FIGS. 3 and 4 is formed from a metallic material having a first coefficient of thermal expansion.

Figure 6:
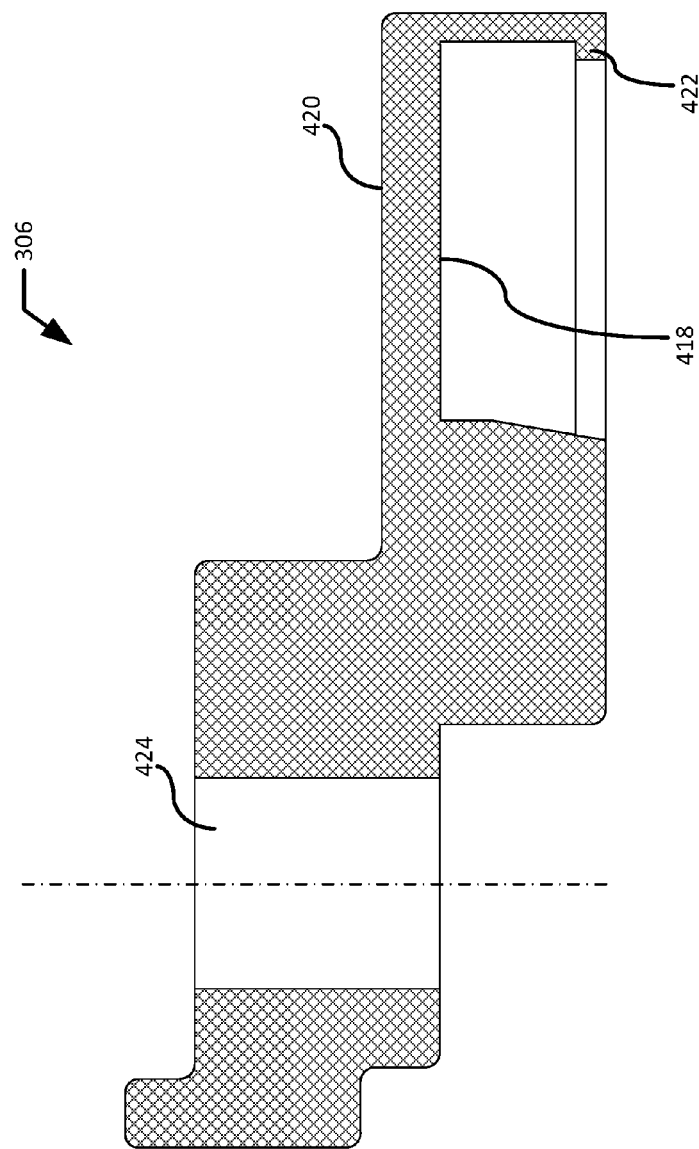
FIG. 6 is an enlarged cross-sectional view showing a partial cross-sectional profile of the example disk holder of FIGS. 3 and 4.
Figure 7:
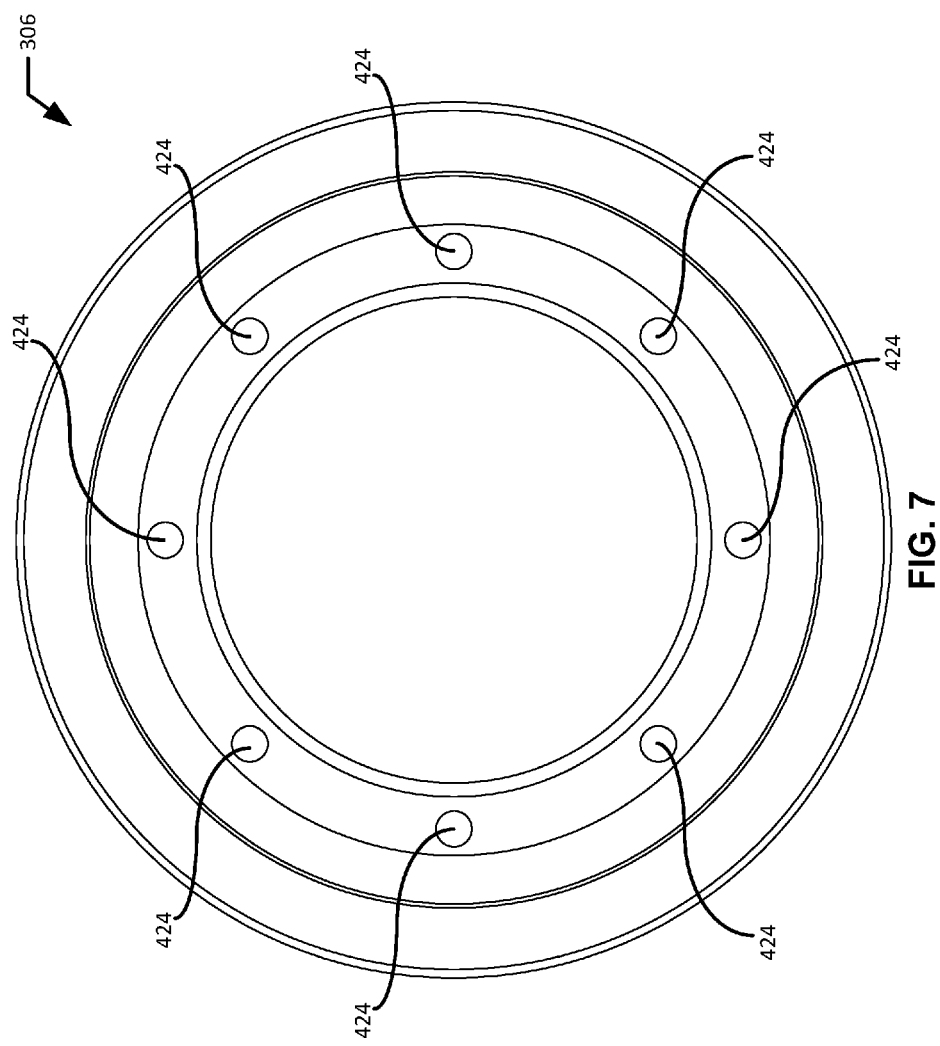
FIG. 7 is a plan view of the example disk holder of FIGS. 3, 4 and 6.

FIG. 6 is an enlarged cross-sectional view showing a partial cross-sectional profile of the example disk holder 306 of FIGS. 3 and 4. FIG. 7 is a plan view of the example disk holder 306 of FIGS. 3, 4 and 6. FIGS. 6 and 7 illustrate the inner surface 418, the outer surface 420, the holding flange 422 and the radial bores 424 of the disk holder 306 of FIGS. 3 and 4 in greater detail.

The example disk retainer 308 of the improved disk assembly 300 of FIGS. 3 and 4 has an annular shape. The disk retainer 308 includes an example retaining flange 426 having example gripping protrusions 428 and an example gripping finger 430. When the sealing disk 302 and the disk gasket 304 are positioned in the disk holder 306 and the disk holder 306 is positioned (e.g., captured) between the disk retainer 308 and the sleeve adaptor 310 as shown in FIGS. 3 and 4, the retaining flange 426 (including the gripping protrusions 428 and the gripping finger 430) of the disk retainer 308 contacts and/or mates with the third portion 410 and the notch 412 of the front side 402 of the sealing disk 302 such that the retaining flange 426 (including the gripping protrusions 428 and the gripping finger 430) partially confines and/or urges the sealing disk 302 in and/or against the disk gasket 304 and/or the disk holder 306.

The gripping protrusions 428 of FIGS. 3 and 4 are formed in and/or on the retaining flange 426 and are configured to mate with the third portion 410 of the sealing disk 302. The gripping protrusions 428 provide resistance to the sealing disk 302 potentially slipping within and/or being ejected from the disk holder 306. In the illustrated example of FIGS. 3 and 4, the gripping protrusions 428 of the retaining flange 426 are V-shaped. In other examples, the gripping protrusions 428 of the retaining flange 426 may have other shapes. For example, the gripping protrusions 428 may be U-shaped, T-shaped, etc. Furthermore, the retaining flange 426 of the disk retainer 308 may include any number of gripping protrusions 428.

The gripping finger 430 of FIGS. 3 and 4 extends from the retaining flange 426 and is configured to mate with the notch 412 of the sealing disk 302. The gripping finger 430 provides resistance to the sealing disk 302 potentially slipping within and/or being ejected from the disk holder 306. In the illustrated example of FIGS. 3 and 4, the gripping finger 430 has a rectangular cross-sectional shape and extends orthogonally from the retaining flange 426. In other examples, the gripping finger 430 may have other shapes and/or may extend from the retaining flange 426 in a direction other than orthogonal. Furthermore, the retaining flange 426 of the disk retainer 308 may include any number of gripping fingers 430.

The example disk retainer 308 of FIGS. 3 and 4 is coupled via the fasteners 314 to the disk holder 306 and to the sleeve adaptor 310 of FIGS. 3 and 4. Example radial bores 432 of the disk retainer 308 are spaced about the annular shape of the disk retainer 308 such that the radial bores 432 of the disk retainer 308 align with corresponding ones of the radial bores 424 of the disk holder 306 and corresponding ones of radial bores (described below) of the sleeve adaptor 310. Each of the radial bores 432 of the disk retainer 308 is configured to receive one of the fasteners 314 to pass through and/or into one of the corresponding radial bores 424 of the disk holder 306 as well as one of the corresponding radial bores of the sleeve adaptor 310 to couple the disk retainer 308 to the disk holder 306 and to the sleeve adaptor 310. The disk retainer 308 of FIGS. 3 and 4 is formed from a metallic material having a second coefficient of thermal expansion that differs from the first coefficient of thermal expansion of the disk holder 306 of FIGS. 3 and 4.

Figure 8:
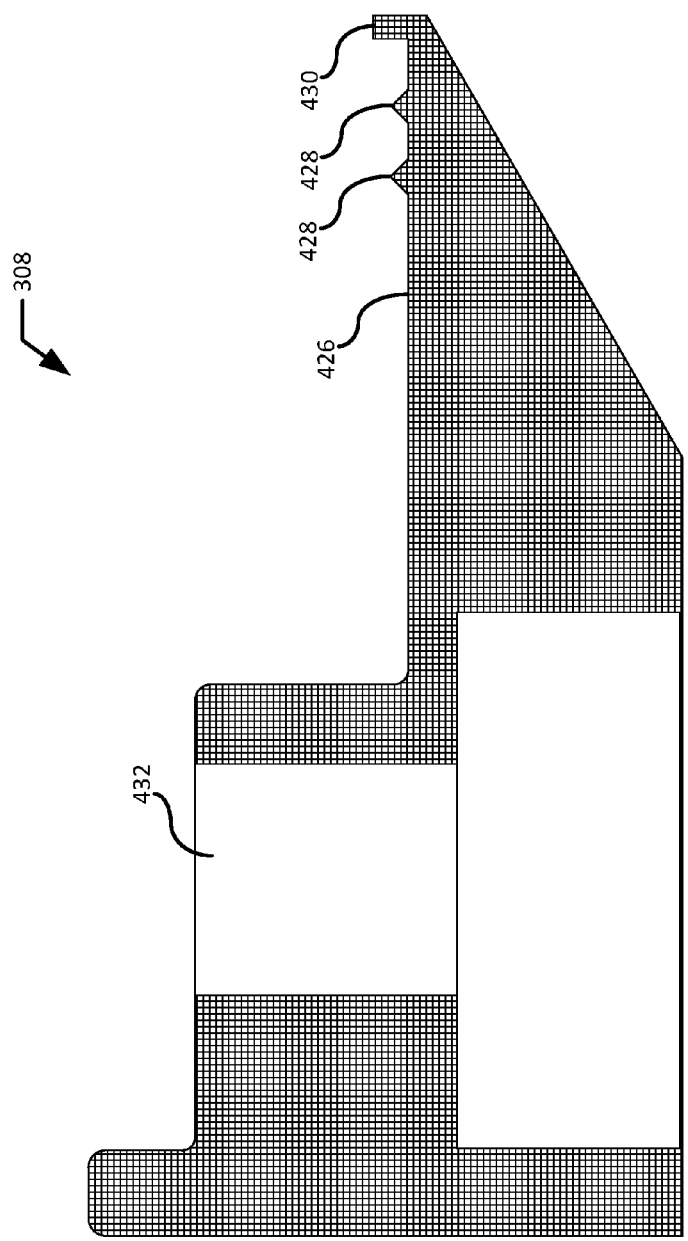
FIG. 8 is an enlarged cross-sectional view showing a partial cross-sectional profile of the example disk retainer of FIGS. 3 and 4.
Figure 9:
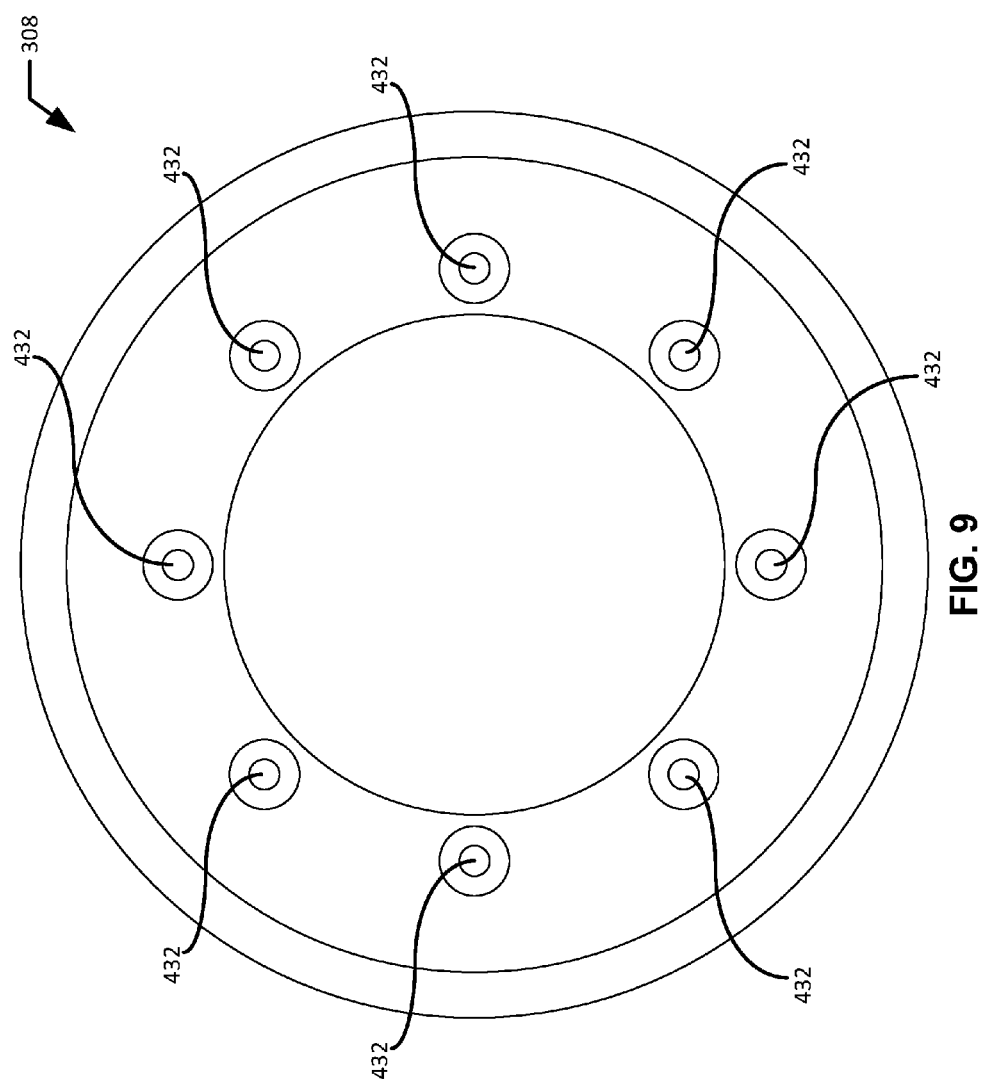
FIG. 9 is a plan view of the example disk retainer of FIGS. 3, 4 and 8.

FIG. 8 is an enlarged cross-sectional view showing a partial cross-sectional profile of the example disk retainer 308 of FIGS. 3 and 4. FIG. 9 is a plan view of the example disk retainer 308 of FIGS. 3, 4 and 8. FIGS. 8 and 9 illustrate the retaining flange 426, the gripping protrusions 428, the gripping finger 430 and the radial bores 432 of the disk retainer 308 of FIGS. 3 and 4 in greater detail.

The example sleeve adaptor 310 of the improved disk assembly 300 of FIGS. 3 and 4 has an annular shape. The sleeve adaptor 310 includes example radial bores 434 and an example threaded portion 436. The sleeve adaptor 310 is coupled via the fasteners 314 to the disk holder 306 and to the disk retainer 308. The radial bores 434 of the sleeve adaptor 310 are spaced about the annular shape of the sleeve adaptor 310 such that the radial bores 434 of the sleeve adaptor 310 align with corresponding ones of the radial bores 424 of the disk holder 306 as well as corresponding ones of the radial bores 432 of the disk retainer 308. Each of the radial bores 434 of the sleeve adaptor 310 is configured to receive one of the fasteners 314 passing through one of the corresponding radial bores 424 of the disk holder 306 and one of the corresponding radial bores 432 of the disk retainer 308 to couple the disk holder 306 and the disk retainer 308 to the sleeve adaptor 310.

The example sleeve adaptor 310 of FIGS. 3 and 4 is also coupled via a threaded connection to the sleeve 312 of FIGS. 3 and 4. The threaded portion 436 of the sleeve adaptor 310 is configured to mate with an example threaded portion 438 of the sleeve 312 to couple the sleeve adaptor 310 to the sleeve 312. When the sleeve adaptor 310 is coupled to the disk holder 306, to the disk retainer 308, and to the sleeve 312 as shown in FIGS. 3 and 4, the disk holder 306 is positioned (e.g., captured) between the disk retainer 308 and the sleeve adaptor 310, the retaining flange 426 (e.g., including the gripping protrusions 428 and the gripping finger 430) of the disk retainer 308 partially confines and/or urges the sealing disk 302 in and/or against the disk gasket 304 and/or the disk holder 306, and the sleeve 312 contacts the outer surface 420 of the disk holder 306.

Figure 10:
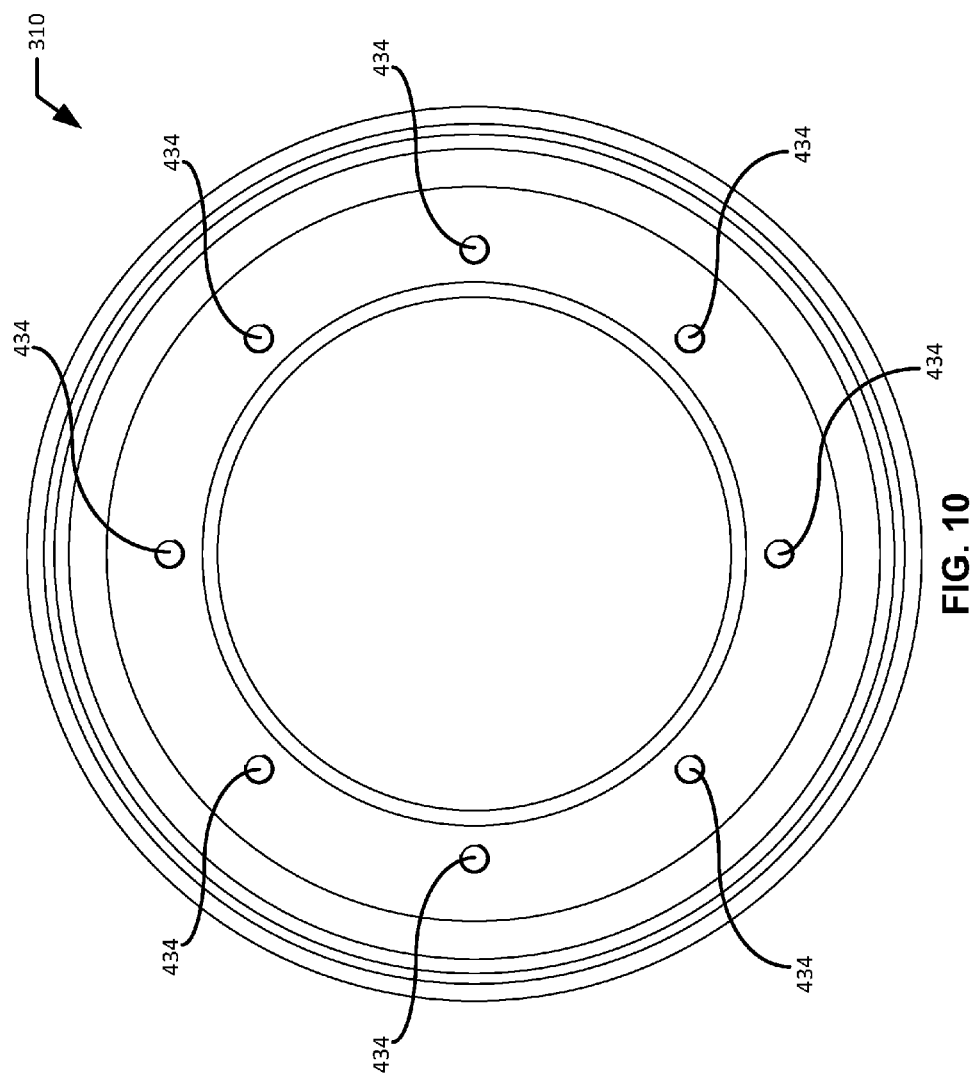
FIG. 10 is a plan view of the example sleeve adaptor of FIGS. 3 and 4.

FIG. 10 is a plan view of the example sleeve adaptor 310 of FIGS. 3, 4 and 8. FIG. 8 illustrates the radial bores 434 of the sleeve adaptor 310 of FIGS. 3 and 4 in greater detail.

The example O-ring 316 of the improved disk assembly 300 of FIGS. 3 and 4 is configured to provide a seal between the disk holder 306, the sleeve adaptor 310, and the sleeve 312.

When the example improved disk assembly 300 of FIGS. 3 and 4 is in use, the disk gasket 304 provides a seal between the back side 404 of the sealing disk 302 and the inner surface 418 of the disk holder 306. The seal provided by the disk gasket 304 prevents fluid from traveling to the back side 404 of the sealing disk 302, and accordingly reduces (e.g., eliminates) pressure from forming at the back side 404 of the sealing disk 302. As a result of reducing the potential for pressure forming at the back side 404 of the sealing disk 302, the sealing disk 302 of the improved disk assembly 300 is less prone (e.g., relative to the sealing disk 102 of the conventional disk assembly 100 of FIGS. 1 and 2 described above) to slip and/or to be ejected from the disk holder 306. The mechanical retaining structures (e.g., the gripping protrusions 428 and the gripping finger 430 of FIGS. 3, 4 and 8) integrally formed on the retaining flange 426 of the disk retainer 308 further reduce the likelihood of the sealing disk 302 slipping within, and/or being ejected from, the disk holder 306.

From the foregoing, it will be appreciated that the disclosed disk assemblies having additional mechanical structures (e.g., retaining structures, sealing structures, etc.) to better retain sealing disks in disk holders provide numerous advantages over conventional disk assemblies that include sealing disks having the potential to slip and/or to be ejected from the disk holders within which such sealing disks are intended to be retained. The additional mechanical structures of the example disk assemblies disclosed herein include a disk gasket positioned between a back side of a sealing disk and an inner surface of a disk holder. When the disk gasket and the sealing disk are positioned as such in the disk holder, the disk gasket supports the back side of the sealing disk and provides a seal between the back side of the sealing disk and the inner surface of the disk holder. The seal provided by the disk gasket advantageously prevents fluid from traveling to the back side of the sealing disk, thereby reducing the potential for the formation of pressure at the back side of the sealing disk. In view of this reduction in the potential for the formation of back side pressure, the sealing disk is less likely to be ejected from the disk holder. The disk gasket may also advantageously function as a secondary sealing surface should the sealing disk ever fail. The additional mechanical structures of the example disk assemblies disclosed herein also include gripping protrusions and a gripping finger formed in and/or on a retaining flange of a disk retainer. The gripping protrusions and the gripping finger engage the sealing disk to advantageously provide additional resistance to the sealing disk potentially slipping within and/or being ejected from the disk holder.

The aforementioned advantages and/or benefits are achieved via the disclosed mechanically-retained sealing disks for use with fluid regulators. In some disclosed examples, an apparatus comprises a disk holder having an inner surface. In some disclosed examples, the apparatus comprises a disk gasket coupled to the inner surface of the disk holder. In some disclosed examples, the apparatus comprises a sealing disk positioned in the disk holder. In some disclosed examples, the sealing disk has a front side including a sealing surface, and a back side located opposite the front side. In some disclosed examples, the back side of the sealing disk is positioned adjacent the disk gasket. In some disclosed examples, the apparatus comprises a disk retainer coupled to the disk holder. In some disclosed examples, the disk retainer is to retain the sealing disk in the disk holder.

In some disclosed examples, the sealing disk is formed from an elastomeric material. In some disclosed examples, the disk gasket is formed from a rubber material. In some disclosed examples, the disk holder has a first coefficient of thermal expansion and the disk retainer has a second coefficient of thermal expansion different from the first coefficient of thermal expansion. In some disclosed examples, the disk gasket provides a seal between the sealing disk and the disk holder. In some disclosed examples, the disk gasket prevents fluid from traveling to the back side of the sealing disk.

In some disclosed examples, the disk retainer includes at least one protrusion to retain the sealing disk in the disk holder. In some disclosed examples, the disk retainer includes a finger to retain the sealing disk in the disk holder. In some disclosed examples, the finger is to mate with a notch formed in the front side of the sealing disk.

In some disclosed examples, the apparatus further comprises a sleeve adaptor coupled to the disk retainer, and a sleeve coupled to the sleeve adaptor. In some disclosed examples, the apparatus further comprises a fluid regulator.

In some disclosed examples, an apparatus comprises a sealing disk having a front side including a sealing surface, and a back side located opposite the front side. In some disclosed examples, the apparatus comprises means for holding the sealing disk. In some disclosed examples, the apparatus comprises means for supporting the sealing disk in the means for holding. In some disclosed examples, the means for supporting is coupled to the means for holding. In some disclosed examples, the back side of the sealing disk is adjacent the means for supporting. In some disclosed examples, the apparatus comprises means for retaining the sealing disk in the means for holding. In some disclosed examples, the means for retaining is coupled to the means for holding.

In some disclosed examples, the sealing disk is formed from an elastomeric material. In some disclosed examples, the means for supporting is formed from a rubber material. In some disclosed examples, the means for holding has a first coefficient of thermal expansion and the means for retaining has a second coefficient of thermal expansion different from the first coefficient of thermal expansion. In some disclosed examples, the means for supporting provides a seal between the sealing disk and the means for holding. In some disclosed examples, the means for supporting prevents fluid from traveling to the back side of the sealing disk.

In some disclosed examples, the means for retaining includes at least one protrusion to retain the sealing disk in the means for holding. In some disclosed examples, the means for retaining includes a finger to retain the sealing disk in the means for holding. In some disclosed examples, the finger is to mate with a notch formed in the front side of the sealing disk.

In some disclosed examples, the apparatus further comprises a sleeve adaptor coupled to the means for retaining, and a sleeve coupled to the sleeve adaptor. In some disclosed examples, the apparatus further comprises a fluid regulator.

Although certain example apparatus and methods have been disclosed herein, the scope of coverage of this patent is not limited thereto. On the contrary, this patent covers all apparatus and methods fairly falling within the scope of the claims of this patent.

What is claimed is:

1. An apparatus, comprising:
   a disk holder having an inner surface;
   a disk gasket coupled to the inner surface of the disk holder;
   a sealing disk positioned in the disk holder, the sealing disk having a front side and a back side located opposite the front side, the front side including a first portion, a second portion, and a notch formed between the first portion and the second portion, the notch extending transversely into the sealing disk from the front side toward the back side, the back side being positioned adjacent the disk gasket, the first portion being a sealing surface to contact a seat ring of a fluid regulator when the fluid regulator is in a closed position; and
   a disk retainer coupled to the disk holder, the disk retainer including a plurality of radial bores spaced about the disk retainer and a retaining flange extending radially from the radial bores, the retaining flange contacting the second portion and having a finger, the finger extending transversely from the retaining flange into the notch of the sealing disk to retain the sealing disk in the disk holder.

2. The apparatus of claim 1, wherein the sealing disk is formed from an elastomeric material.

3. The apparatus of claim 1, wherein the disk gasket is formed from a rubber material.

4. The apparatus of claim 1, wherein the disk holder has a first coefficient of thermal expansion and the disk retainer has a second coefficient of thermal expansion different from the first coefficient of thermal expansion.

5. The apparatus of claim 1, wherein the disk gasket provides a seal between the sealing disk and the disk holder.

6. The apparatus of claim 1, wherein the disk gasket prevents fluid from traveling to the back side of the sealing disk.

7. The apparatus of claim 1, wherein the retaining flange further includes at least one gripping protrusion spaced apart from the finger and extending transversely from the retaining flange, the at least one gripping protrusion contacting the second portion of the front side of the sealing disk to retain the sealing disk in the disk holder.

8. The apparatus of claim 1, further comprising:
   a sleeve adaptor coupled to the disk retainer; and
   a sleeve coupled to the sleeve adaptor.

9. The apparatus of claim 1, further comprising the fluid regulator.

10. An apparatus, comprising:
    a sealing disk having a front side and a back side located opposite the front side, the front side including a first portion, a second portion, and a notch formed between the first portion and the second portion, the notch extending transversely into the sealing disk from the front side toward the back side, the first portion being a sealing surface to contact a seat ring of a fluid regulator when the fluid regulator is in a closed position;
    means for holding the sealing disk;
    means for supporting the sealing disk in the means for holding, the means for supporting being coupled to the means for holding, the back side of the sealing disk being adjacent the means for supporting; and means for retaining the sealing disk in the means for holding, the means for retaining being coupled to the means for holding, the means for retaining including a plurality of radial bores spaced about the disk retainer and a retaining flange extending radially from the radial bores, the retaining flange contacting the second portion and having a finger, the finger extending transversely from the retaining flange into the notch of the sealing disk.

11. The apparatus of claim 10, wherein the sealing disk is formed from an elastomeric material.

12. The apparatus of claim 10, wherein the means for supporting is formed from a rubber material.

13. The apparatus of claim 10, wherein the means for holding has a first coefficient of thermal expansion and the means for retaining has a second coefficient of thermal expansion different from the first coefficient of thermal expansion.

14. The apparatus of claim 10, wherein the means for supporting provides a seal between the sealing disk and the means for holding.

15. The apparatus of claim 10, wherein the means for supporting prevents fluid from traveling to the back side of the sealing disk.

16. The apparatus of claim 10, wherein the retaining flange further includes at least one gripping protrusion spaced apart from the finger and extending transversely from the retaining flange, the at least one gripping protrusion contacting the second portion of the front side of the sealing disk to retain the sealing disk in the means for holding.

17. The apparatus of claim 10, further comprising:
a sleeve adaptor coupled to the means for retaining; and
a sleeve coupled to the sleeve adaptor.

18. The apparatus of claim 10, further comprising the fluid regulator.

19. The apparatus of claim 1, wherein the disk holder includes a plurality of radial bores spaced about the disk holder, respective ones of the radial bores of the disk retainer being aligned with corresponding respective ones of the radial bores of the disk holder.

20. The apparatus of claim 1, wherein the retaining flange further includes a plurality of V-shaped gripping protrusions spaced apart from the finger and extending transversely from the retaining flange, the V-shaped gripping protrusions contacting the second portion of the front side of the sealing disk to retain the sealing disk in the disk holder.

* * * * *